United States Patent
Lange et al.

(10) Patent No.: US 7,596,543 B2
(45) Date of Patent: Sep. 29, 2009

(54) SYSTEMS AND METHODS FOR PROCESSING ELECTRONIC DOCUMENTS IN A COMPUTER NETWORK

(75) Inventors: Christoph Lange, Oestringen (DE); Karin Brecht-Tillinger, Edingen-Neckarhausen (DE); Oleg Shestakov, Eppelheim (DE); Ruediger Radcke, Budapest (HU); Erwin Pinter, Neuhofen (DE)

(73) Assignee: SAP AG, Walldorf (DE)

( * ) Notice: Subject to any disclaimer, the term of this patent is extended or adjusted under 35 U.S.C. 154(b) by 382 days.

(21) Appl. No.: 11/187,029

(22) Filed: Jul. 22, 2005

(65) Prior Publication Data

US 2006/0020520 A1   Jan. 26, 2006

(30) Foreign Application Priority Data

Jul. 22, 2004 (EP) .................................. 04017346

(51) Int. Cl.
*G06F 17/30* (2006.01)
(52) U.S. Cl. .............................. 707/1; 705/26; 705/176; 705/34; 705/1
(58) Field of Classification Search .................... 705/26, 705/34, 1; 713/176
See application file for complete search history.

(56) References Cited

U.S. PATENT DOCUMENTS 5,758,327 A   5/1998 Gardner et al.

| | | | |
|---|---|---|---|
| 2001/0018739 A1* | 8/2001 | Anderson et al. | 713/176 |
| 2002/0032726 A1* | 3/2002 | Moreau et al. | 709/203 |
| 2002/0184123 A1* | 12/2002 | Sijacic et al. | 705/34 |
| 2003/0069805 A1* | 4/2003 | Yui | 705/26 |
| 2003/0074269 A1* | 4/2003 | Viswanath | 705/26 |
| 2003/0177070 A1 | 9/2003 | Viswanath et al. | |
| 2004/0064333 A1* | 4/2004 | J'Maev | 705/1 |

FOREIGN PATENT DOCUMENTS

WO   WO 98/49644   11/1998

\* cited by examiner

*Primary Examiner*—Pierre M Vital
*Assistant Examiner*—Truong V Vo
(74) *Attorney, Agent, or Firm*—Finnegan, Henderson, Farabow, Garrett & Dunner, L.L.P.

(57) ABSTRACT

Systems and methods are provided for processing an electronic document by one or more computer network components having network addresses in a computer network. Within the electronic document, a plurality of approval items are identified that require status manipulation operations within the electronic document. These approval objects may be grouped together based on the properties of the approval items to form one or more approval objects. Thereafter, each approval object is associated with one or more computer network components based on the properties of the approval object, so that each approval object may be routed to the network addresses of the associated computer network components for status manipulation processing. Depending on the results of the status manipulation processing, a follow-on data set may be generated for the electronic document and sent to one or more additional computer network components.

21 Claims, 6 Drawing Sheets

SYSTEMS AND METHODS FOR PROCESSING ELECTRONIC DOCUMENTS IN A COMPUTER NETWORK

BACKGROUND

1. Field of the Invention

The present invention generally relates to the processing of electronic documents in a computer network. More particularly, the invention relates to systems and methods for processing electronic documents that require, for example, status manipulation operations in a computer network-based collaborative workflow.

2. Background Information

Computer network-based collaborative electronic document (or data set) processes commonly transverse a plurality of stages, such as assembling, storing, review and transmission stages. These stages are typically defined in the form of a workflow. Transitions from one workflow stage to another may be contingent upon a computer network component processing the data set within the current workflow stage. The transition from one workflow stage to another may be initiated automatically or by automated dialogue-type communications.

The computer-assisted procurement of goods and services and the computer-assisted manufacturing of complex machinery are typical examples of multi-stage collaborative electronic document processes. During a procurement process, for example, electronic documents containing data pertaining to different collaborative processing steps, such as purchase requisitions, goods ordering, goods receipt, and invoicing, are successively generated and have to be successively stored, processed and confirmed.

As complex collaborative processes necessitate the interaction of a plurality of computer network components, software mechanisms handling the generation, storage and manipulation of process-related electronic documents typically operate on distributed components of a computer network. This feature allows the electronic documents to be accessed from different computer network components (or processors) at different workflow stages.

When an electronic document is subjected to a collaborative workflow and waiting to be processed by a computer network component, the contents of the electronic document may be identified as "waiting" for review. Such waiting periods considerably lengthen the duration of the entire workflow. Another problem is that during (or waiting for) the review intervention, the contents of an electronic document may not be accessible by other network components to ensure data integrity. This restriction results in other users experiencing an access delay which, depending on the specific situation, can range from several seconds to several hours or days. Such access delays are disruptive in scenarios of the above kind where several stages have to be traversed before the workflow is completed, and particularly in arrangements that involve numerous collaborative users, workflow stages, and processes running in parallel. Furthermore, as the entire contents of a data set may be provided to a network component for processing, unnecessary bandwidth is consumed both in the receipt of the data set for processing and transmission of the processed data set.

FIG. 3 illustrates a conventional technique 300 for handling an electronic document (in an exemplary procurement context) having multiple items associated therewith, each of which may require status manipulation by one or more processors (i.e., computer network components). An initial electronic document IED (e.g., shopping cart data set) 310 containing at least one item that is subject to status processing (e.g., approval/rejection), is routed via control information included its header to processor A 320, processor B 330, ... processor N 340 for serial processing. Once (or if) the electronic document has been fully processed, which in this case requires an approval from each of the processors, it is sent to a transfer module 350, which creates for the electronic document one or more follow-on electronic documents FOEDs (e.g., purchase order data sets) 360, 370. With this arrangement, the items associated with the electronic document result in the electronic document being processed by a particular processor. Even if only a single item amongst a large number of items requires further processing, the contents of the entire electronic document are made available to each processor, which may result in unnecessary processing power and bandwidth consumption.

An alternative processing approach to the header-based technique of FIG. 3 is illustrated in FIG. 4. With this approach, items 410, 420, 430 within an initial electronic document (e.g., shopping cart) 405 are individually and serially provided to a series of processors 440, 450, 460 whether or not processing is actually required by the applicable processor (thereby increasing needed processing power and network traffic). If and when the electronic document has been fully processed, a transfer module 470 conveys the relevant item information into a single follow-on electronic document (e.g., purchase order) 475, 485, and 495. As an individual follow-on electronic document 475, 485, 495 is associated with each item 410, 420, 430, multiple follow-on electronic documents may be generated and transmitted to a single computer network component (e.g., associated with a vendor) resulting in increased processing and network traffic.

Accordingly, it will be appreciated that there remains a need for an improved electronic document processing technique that minimizes high network traffic conventionally associated with collaborative workflows and reduces the overall processing power consumed during a collaborative workflow.

It is an object of the present invention to enable an efficient handling of electronic documents containing many items in a collaborative workflow scenario as described above. Moreover, it is an object of the present invention to provide an approach that enables an automatic and standardized processing of complex electronic documents and ensures an accelerated processing thereof, while at the same time minimizing network traffic.

SUMMARY OF THE INVENTION

According to one aspect of the invention, a method is provided for processing an electronic document by one or more computer network components having network addresses in a computer network. The method includes the steps of identifying a plurality of approval items requiring status manipulation operations within the electronic document, grouping together the approval items to form one or more approval objects based on properties of the approval items, associating each approval object with one or more computer network components based on the properties of the approval object, and routing each approval object to the network addresses of the associated computer network components for status manipulation processing.

In some variations, the approval objects are sequentially routed to each of the associated computer network components. To facilitate the sequential routing, the method may further include the step of ranking the order in which the approval objects are routed to each of the associated computer network components.

In other variations, the method may include the step of routing the approval objects to each of the associated computer network components in parallel. Such parallel routing may be utilized when each of the computer network components processes the approval objects independently of any prior, coincident, or subsequent processing steps. To effect parallel processing, the method may include the step of simultaneously sending copies of the approval objects to each of the applicable computer network components, such that each of the computer network components returns data indicative of the processing conducted thereby.

In addition, in some variations, the routing of the approval objects may be accomplished using header information and item information (e.g., underlying numerical/alpha-numerical values, etc.) within the electronic document. The header and item information may also be used in the identification and association of approval objects.

To ensure that the associations made by the method continue to be accurate or timely, the associating step may include the steps of: (periodically or alternatively at irregular intervals or on command) determining if processing requirements for a computer network component have been modified, and reassociating each approval object affected by the modified processing requirements with one or more computer network components (or alternatively re-grouping the approval items). The latter step preferably occurs prior to the processing of the approval objects, although it will be appreciated that the processing may be repeated if desired. Alternatively, or in addition to, the method may include the steps of determining if an approval item within an approval object has been modified by one or more of the computer network components, and re-grouping the modified approval items to one or more approval objects associated with one or more computer network components for routing to the one or more computer network components. This latter updating technique may be useful in situations, for example, where a processing component splits up an approval item (i.e., an order for 10 widgets is modified into 2 orders for 5 widgets) or a property, such as underlying value is modified (e.g., underlying value was initially determined to exceed €1,000, so approval object was routed to a first computer network component, the first computer network component determined that the underlying value was below €1,000, which requires that the approval object be routed to a second computer network component that handles approval objects having values less than €1,000, etc.).

Embodiments consistent with the invention may also include the provision of an indicator signal after the electronic document has been processed by the associated computer network components. This indicator signal may be used in connection with further processing of the electronic document and/or approval objects, such as the generation of a purchase order or invoice. If further processing pertains to the generation of a follow-on document such as a purchase order, methods consistent with the invention may also include the steps of correlating each processed approval item with one or more (vendor) network nodes, assembling the processed approval item with commonly correlated nodes to generate purchase orders, and transmitting the purchase order to the nodes.

Embodiments of the invention also relate to computerized systems for performing methods for processing an electronic document and computer program products comprising program code portions for performing methods consistent with the invention when the computer program product is run on one or more computers or computer systems. Such computer program products may be stored on a computer readable recording medium to facilitate usage by multiple computers or computing units.

In one embodiment, a system is provided comprising a computer processor and a memory coupled to the processor, wherein the memory is encoded with one or more programs for processing an electronic document via a computer network by one or more computer network components having network addresses consistent with the embodiments and features described herein.

Embodiments of the invention also relate to a system for processing an electronic document by one or more computer network components having network addresses in a computer network. Such a system might comprise an identification unit to identify a plurality of approval items requiring status manipulation operations within the electronic document, a grouping unit to group together the approval items to form one or more approval objects based on properties of the approval items, an association unit to associate each approval object with one or more computer network components based on the properties of the approval object, and a routing unit to route each approval object to the network addresses of the associated computer network components for status manipulation processing.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

Referring now to the drawings, in which like numerals represent like elements throughout the several figures, aspects of the present invention and the exemplary operating environment will be described. In the drawings show.

DESCRIPTION OF THE EMBODIMENTS

In the following description, for purposes of explanation and not limitation, specific details are set forth, such as particular data formats and processes utilized in connection therewith in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). In particular, while the different embodiments described herein below are incorporated into or used in conjunction with particular types of multi-stage workflows, it will be appreciated by the skilled artisan that the invention is applicable to a wide variety of arrangements where an electronic document (or data set) includes multiple items that may require processing by one or more external computer network components.

Embodiments of the present invention may be implemented in a client/server configuration. One possible client/server configuration in which the present invention can be carried out is the so-called three-tiered architecture which separates the components of a network system into three functional groups: presentation, application, and database. By way of example, this is illustrated in FIG. 1 through a hardware-related view 100.

Figure 1:
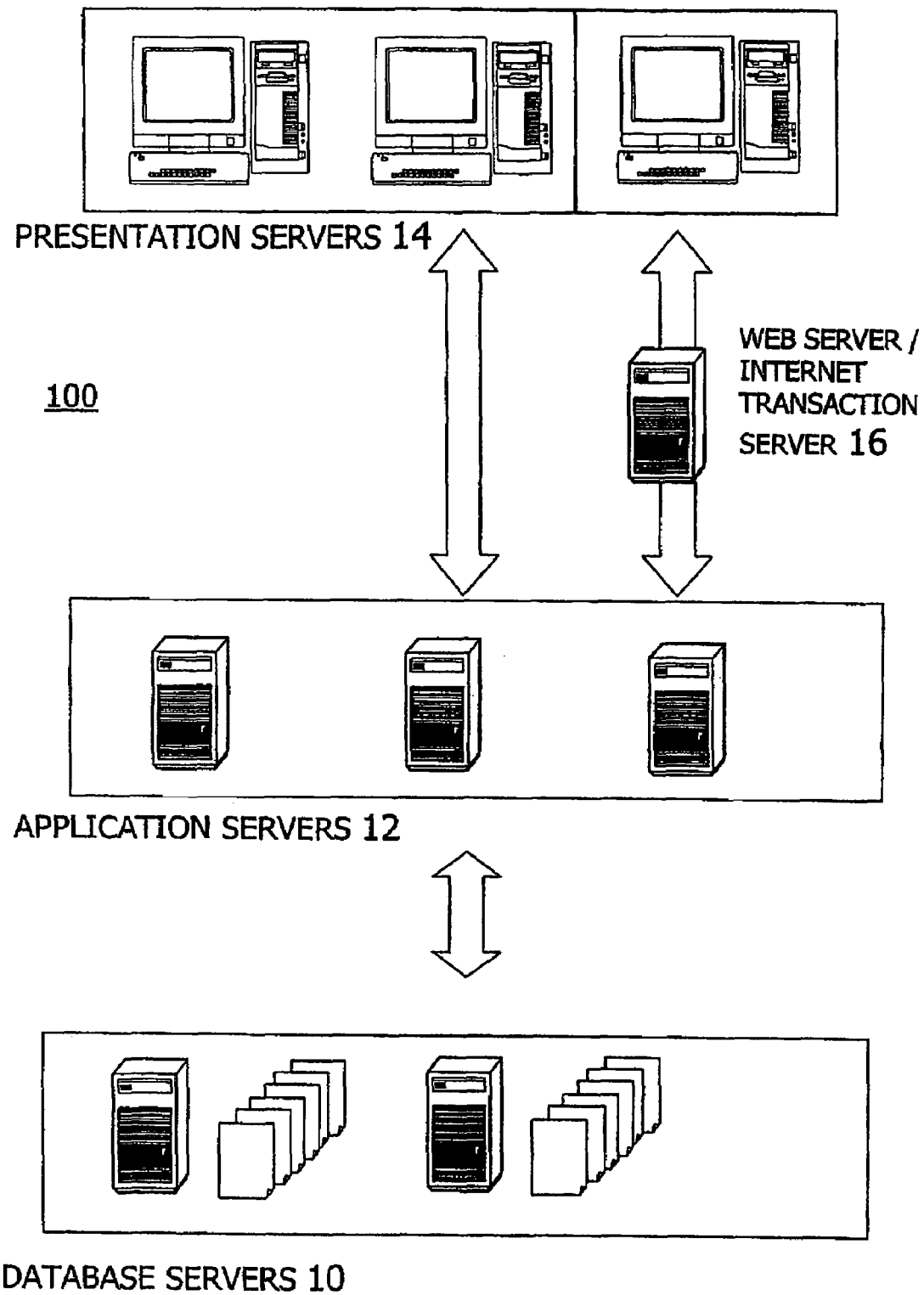
FIG. 1 is a schematic diagram illustrating a hardware-oriented view of an exemplary three-tiered client/server.

With the three-tiered architecture shown in FIG. 1, each hardware group is configured to support demands of its functions. The one or more database servers 10 contain the databases. Application servers 12 interfacing the database servers 10 include the processing logic of the system with services such as spooling, dispatching user requests, and formatting data. The tasks related to the presentation of data are handled by presentation servers 14, which are typically personal computers or workstations, enabling easy access to the system. External presentation servers 14 may be connected to the application servers 12 via the Internet and a web server/Internet transaction server 16. Communication among the three tiers can be accomplished with the use of standard protocol services mentioned above, such as the ones provided by TCP/IP or CPIC. CPIC stands for Common Programming Interface Communication and includes standard functions and services for program-to-program communication.

Figure 2:
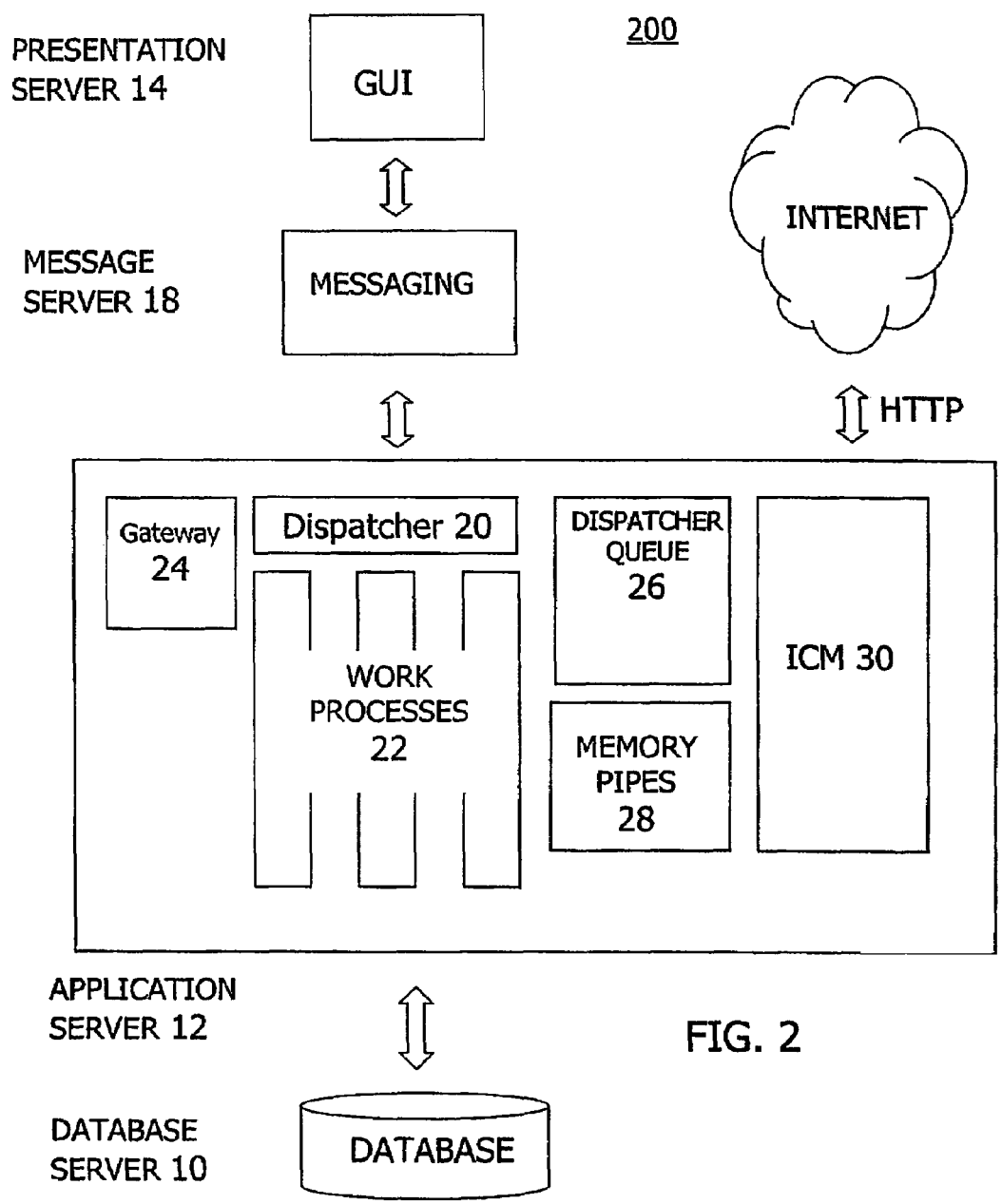
FIG. 2 is a schematic diagram illustrating a software-oriented view of an exemplary three-tiered client/server configuration of the system depicted in FIG. 1.
Figure 3:
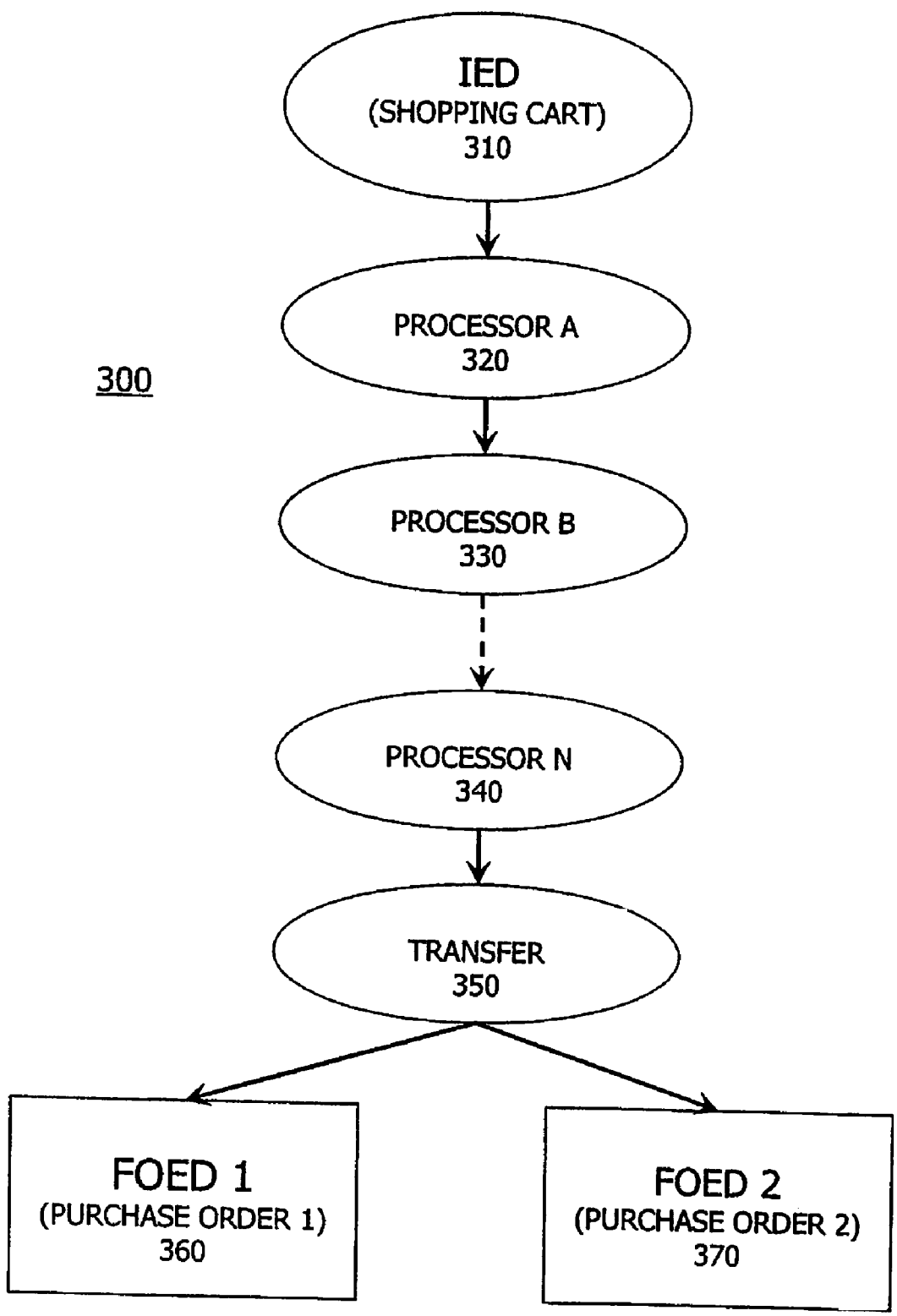
FIG. 3 is a flowchart diagram illustrating a first conventional technique for processing an electronic document having multiple approval objects within an electronic procurement process.
Figure 4:
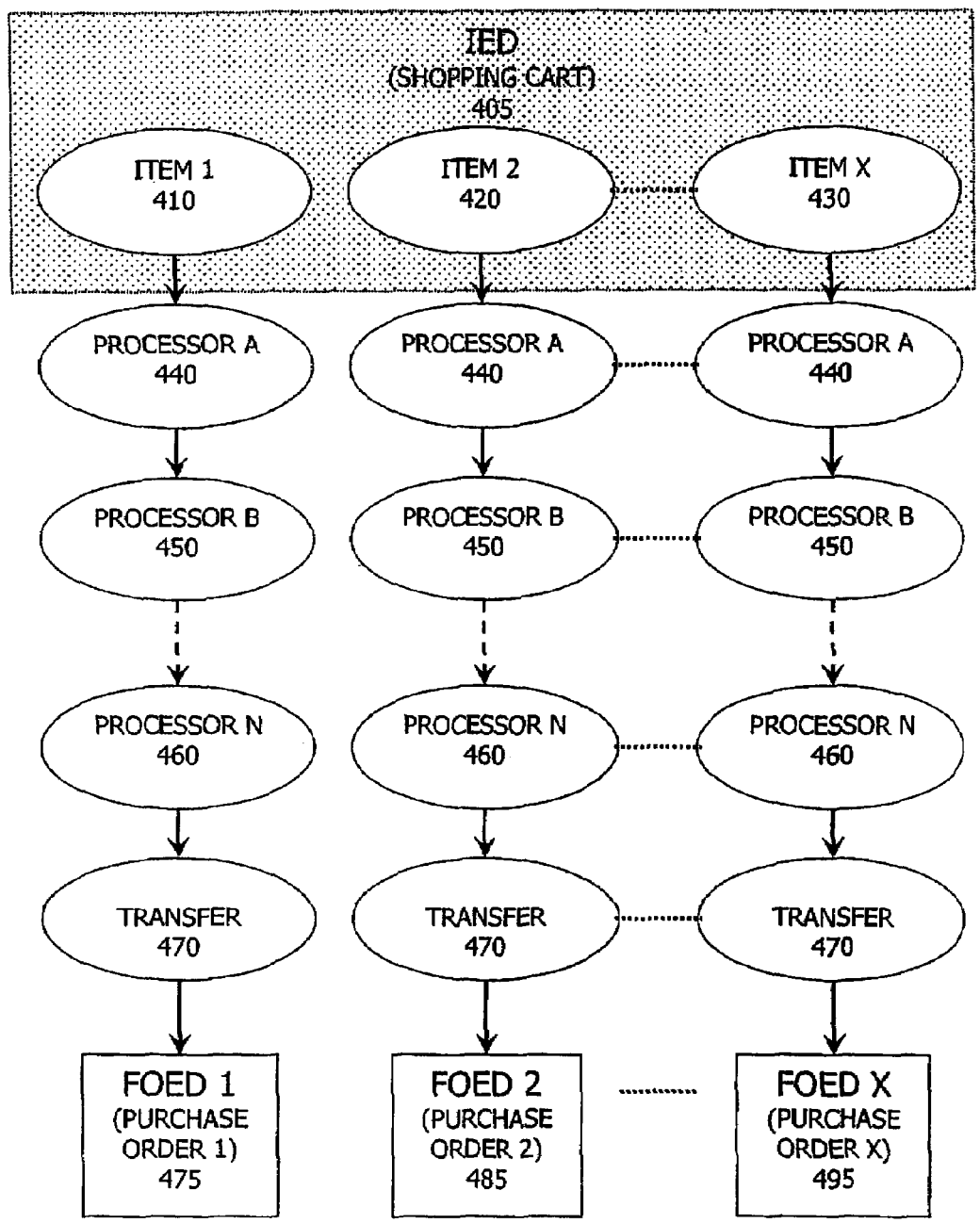
FIG. 4 is a flowchart diagram illustrating a second conventional technique for processing an electronic document having multiple approval objects within an electronic procurement process.

The three-tiered hardware architecture depicted in FIG. 1 is shown in FIG. 2 in a software-related view 200. As becomes apparent from FIG. 2, the software components that may be used in context with embodiments of the present invention include a GUI installed on the presentation server 14 of FIG. 1 and an application that runs on the application server 12. The application includes interfaces to the database installed on database servers 10, to the Internet and, via the messaging component installed on a message server 18, to the GUI. The message server 18 is a service used by different application servers 12 to exchange data and internal messages. The main tasks of the message server 18 include the transfer of messages and the distribution of workload between individual application servers 12.

The application running on the application server 12 includes a dispatcher 18 interfacing the message server 18 and one or more presentation servers 14 on the one hand and a plurality of parallel workflows 22 on the other hand. Each workflow process 22 has an interface to the database on the database server 10. Furthermore, a gateway 24 is provided that may either be installed, from a hardware point of view, on the application server 12 or on a dedicated gateway server (not shown). The gateway service provided by the gateway 24 allows for a communication between different applications using the CPIC protocol. The function of the gateway 24 is to exchange large amounts of data between application servers, in contrast to the message server 18 which only exchanges brief internal and control messages. The application component depicted in FIG. 2 further includes dispatcher queues 26, memory pipes 28 and an Internet Communication Manager (ICM) 30, interfacing the Internet.

In the following description, the interrelation among the individual software components depicted in FIG. 2 is described in more detail.

As data is entered in the presentation server 14 (or otherwise generated), the data is received by the GUI, converted to a standard format, and sent via the messaging server 18 to the dispatcher 20. The connection between the GUI on the presentation server 14 and the dispatcher 20 is made with a protocol like DIAG, according to which small data packages are sent through a network.

The dispatcher 20 checks whether there are available work tasks (on the applicable computer network components/processors) for processing the request received from the GUI. A workflow typically involves a plurality of such work tasks. If no work tasks are available, the request is kept together with other requests in the dispatcher queues 26 until a work task becomes available.

Once a work task becomes available, the dispatcher 20 sends the user data to the available work process 22. A work process 22 is a program (executed on a computer network component/processor) in charge of executing application tasks consistent with the present invention. Each work process 22 acts as a specialized system service. From the point of view of an operating system, a group of parallel work process 22 as depicted in FIG. 2 makes up a runtime system. Each individual work process 22 includes a task handler, a sub-processor, and a database interface (not shown).

The work process 22 may execute dialogue steps for the presentation server 14. These steps generally relate to the processing or display of a single GUI screen, which means that right after execution of a dialogue step for a user session is completed by a work process 22, it is immediately available for use by another user session. For its processing, each dialogue step needs code, dictionary objects, and data. These elements may come from the database residing on the database servers 10 or from an internal memory of the application server 12. Within a dialogue step, the task handler (not shown) is in charge of assigning the corresponding tasks to the internal components (dialogue interpreter and processor), finally sending a SQL request to the database servers 10. The database servers 10 send the requested data back to the work process 22, which in turn process it and passes it via the dispatcher 20 to the presentation server 14. The GUI on the presentation server 14 formats the requested data and builds up the screen for the user.

If during a particular work process 22 application data has to be exchanged with other applications, such as legacy applications or external applications, the functionality of the gateway 24 is activated.

The ICM 30 allows the direct processing of HTTP requests coming from the Internet and/or a browser running on a presentation server 14, and for sending HTTP requests as HTTP client requests to the Internet. The ICM 30, which may be configured as a dedicated kernel process, uses threads to communicate as a server or as a client on the Internet. If an HTTP request is being processed by a work process 22, the memory pipes 28 are used for data transfer. The memory pipes 28 are located in a shared memory portion. In its Web client position a work process 22 creates an HTTP request which is sent to a Web server. It then receives the HTTP response and the work process 22 proceeds on the basis of the HTTP response.

The foregoing is described, for illustrative purposes only, in connection with an electronic procurement process involving a plurality of individual workflows (and associated work processes 22) and a plurality of network components as described with reference to FIGS. 1 and 2. The skilled artisan will appreciate that the current invention may be applied to a variety of arrangements where there is a need for increased efficiency in processing electronic documents having multiple items, each of which may be subjected to separate processing steps and/or processors.

A typical electronic procurement process commences with an electronic requirement request to create an initial electronic document (IED) such as a shopping cart data set (or simply "shopping cart"). Then, a follow-on electronic document (FOED) in the form of a purchase order data set (or simply "purchase order") is created, and if desired, a status and tracking query is formulated. A consecutive follow-on electronic document in the form of a goods and services receipt data set (or simply "confirmation") follows. Generation of a final follow-on electronic document, in the form of an invoice data set (or simply "invoice"), electronic invoice approval and payment complete the process.

The entities involved in the electronic procurement process include a company's intranet, as well as an Internet layer attached to the intranet as has been explained with reference to FIG. 2. The intranet typically includes presentation services, message services, application services, and database services while the Internet layer includes Internet transaction services and web services for hosting various databases like an electronic catalog and a vendor database as well as for providing an electronic marketplace. The electronic marketplace focuses on the efficiency of virtual communities and provides a collaborative platform that enables electronic procurement to take place across multiple software systems and services. The electronic marketplace provides the necessary infrastructure for virtual markets, allowing multiple organizations to electronically communicate with the purpose of conducting collaborative processes.

In a first step of the electronic procurement process, a shopping cart is created, for example, by searching the electronic catalog. The electronic catalog is regularly updated and allows real-time pricing and availability checking for goods or services to be ordered. Updating of the electronic catalog is performed via the vendor database. It should be noted that the electronic catalog may partially or completely be located in a central database of the intranet. Instead of or in addition to using the electronic catalog, requirements may be entered directly on a GUI of a presentation server located in the intranet (not shown) and transferred to the shopping cart.

A shopping cart may include only a single data item (e.g., product category) or a plurality of data items in the case of complex orders. Additionally, each shopping cart includes a header with general data (routing information, time stamp, denomination, etc.) and an association with a follow-on document table. The follow-on document table contains all follow-on document records for the shopping cart or references to these records. As a result, the individual processing stages are electronically documented and dependencies are saved.

Once an electronic shopping cart has been created, the requirements comprised therein may be held or ordered. When holding the requirements, the shopping cart is temporarily stored locally and can be processed again at a later time. When the user wishes to initiate the next stage (ordering), including creation of a follow-on document in the form of a purchase order, (depending on whether the shopping cart was processed in a collaborative workflow to manipulate its initial status and depending on its final status as described in more detail below) the application server checks whether the contents of the shopping cart need to be approved or require any other status manipulation processing.

Generally, a shopping cart (or the individual items contained therein) must have a predefined approval status (that may be indicated as header information or in a database portion associated therewith) before a purchase order can be created (i.e., that it has been processed by one or more processors resulting in an approval flag or header being associated with the items within the shopping cart). If a shopping cart has been processed by the applicable processors (e.g., the items have been approved by manipulating status information associated therewith) or if it is determined that no status manipulation processing (e.g., approval) is required, the system automatically creates one or more purchase orders (depending on factors such as sourcing, cost, etc.) as follow-on documents. This means that the status manipulation processes performed in relation to the shopping cart as a whole or its individual items control the further course of the workflow and thus the interaction of the participating computer network components.

Both the shopping cart and the purchase order are stored in the central database of the intranet. On creation of the purchase order, a reference to this follow-on document is written in the follow-on document table associated with the shopping cart. By this, the purchase order is associated with the shopping cart. It should be noted that two or more individual purchase orders may be created for a single shopping cart. This may be the case for example if different data items (goods/services) of the shopping cart are ordered from different vendors or if multiple sourcing is desired.

Once a purchase order has been created, it is sent electronically via the Internet to a node associated with the system of a vendor using for example XML. Other messaging protocols and messaging services like e-mail or EDI may be used also. As an alternative to sending the purchase order to a particular vendor, it may also be placed within an electronic marketplace (i.e., a forum for seeking responses to an RFQ, etc.), or a traditional hard copy purchase order may be provided to the vendor.

After the goods have been delivered or after the services have been performed, a confirmation document is created. Before the final follow-on document (i.e., an invoice) can be created, the confirmation document must have an approved status. Similar to the steps taken prior to the generation of the purchase order, the confirmation document may contain multiple items that require processing by one or more processors prior to the generation of the invoice.

Once the confirmation has been created, a reference to this follow-on document is written in the follow-on document table of the shopping cart. Additionally, the confirmation is stored in the central database of the intranet. It should be noted that for a single purchase order two or more confirmations may be created, for example when the ordered goods are received with different deliveries. In such a case, a first confirmation is created for the initial delivery and one or more further confirmations are created for the amount of goods still open after the first delivery.

The final follow-on document in the form of an invoice is created by the vendor's system and transferred for example by XML to the intranet where it is stored in the central database. At the same time a reference to this newly created follow-on document is written in the follow-on document table of the shopping cart and a collaborative approval workflow may started.

It should be noted that in principle, the invoice may also be created within the intranet. On the other hand, the confirmation need not necessarily be created within the intranet, but may be created by the vendor's system and transferred to the intranet via the Internet layer.

Figure 5:
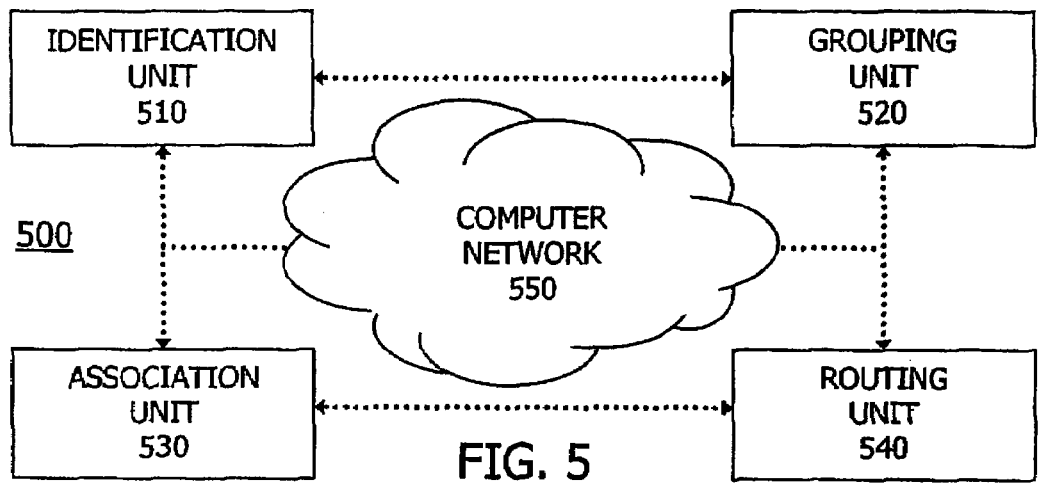
FIG. 5 is a schematic diagram illustrating an exemplary system for processing data sets, consistent with an embodiment of the present invention.

FIG. 5 illustrates a schematic diagram of an exemplary system 500 for processing an electronic document by one or more computer network components having network addresses in a computer network. As shown in FIG. 5, the system 500 comprises an identification unit 510, a grouping unit 520, an association unit 530, and a routing unit 540 all in communication either via a computer network 550 or direct couplings (or bus) linking the units together. The system 500 may be used for handling an electronic document, such as a shopping cart, that may be subjected to processing (such as status manipulation) by one or more computer network components within the computer network 550. The identification unit 510 may be used to identify a plurality of approval items requiring status manipulation operations within the electronic document (based on, inter alia, items within fields of the item electronic document). The electronic document may be obtained directly from another module or device that receives and/or assembles the electronic document prior to the provision of the electronic document to the identification unit 510.

The grouping unit 520 may group together the approval items to form one or more approval objects based on the properties of the approval items. Further, the association unit 530 may associate each approval object with one or more computer network components based on the properties of the approval object (e.g., the properties of the items included therein). In other words, the association unit either determines or is provided with the processing requirements for each of the computer network components, and these processing requirements are mapped to the approval objects to determine if processing by such approval objects is required.

The routing unit 540 may route the groups of approval objects to the network addresses of the associated computer network components (using, for example, header information, properties of the approval objects, properties of the approval items, etc.) for processing. Alternatively, unit 540 may generate a command for another unit or module within the system 500 to transmit data pertaining to the approval objects to the designated computer network components.

Figure 6:
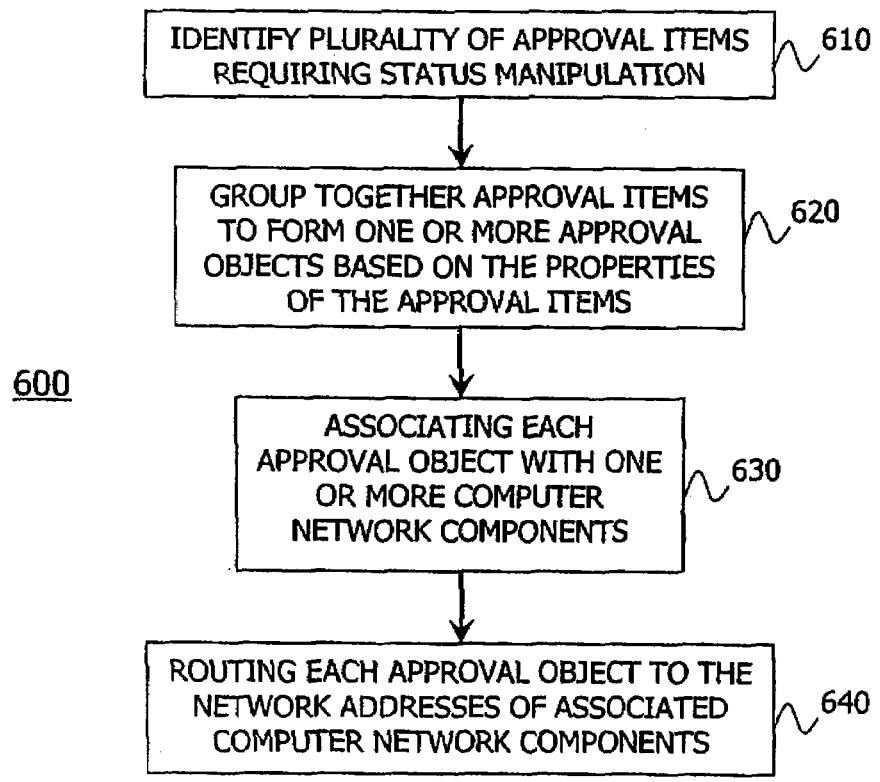
FIG. 6 is a flowchart diagram illustrating an exemplary method for processing data sets, consistent with an embodiment of the present invention.

With reference to FIG. 6, an exemplary method 600 for processing an electronic document by one or more computer network components having network addresses in a computer network is illustrated in the form of a flowchart diagram. The method commences with, at step 610, identifying a plurality of approval items requiring status manipulation operations within the electronic document. It will be appreciated that there may be items within the electronic document that do not require further processing and are therefore not identified as approval items. Thereafter, at step 620, the identified approval items are grouped together to form one or more approval objects based on the properties (such as identification codes, numerical values, etc.) of the approval items 620. At step 630, each approval object is associated with one or more computer network components based on the properties of the approval object. As it may be required to process the approval object with multiple computer network components, each approval object may be associated with more than one computer network component. Subsequently, these approval objects are routed, at step 640, to the network addresses of the associated computer network components for status manipulation processing. The status manipulation processing determines the further course of the collaborative workflow performed in relation to the electronic document, including the creation and distribution of one or more follow-on documents.

In some variations, the approval objects are sequentially routed to each of the associated computer network components. The order in which the computer network components process the approval objects may be pre-determined or it may be based on load-balancing, round-robin, or other distribution techniques. In connection therewith, the method may also include the step of ranking the order in which the approval objects are routed to each of the associated computer network components. Each computer network component may return the processed approval objects to a routing unit for further routing, or in the alternative, the computer network component may forward the grouped approval objects to additional computer network components (common to those approval objects).

As an alternative to the sequential routing described above, the approval objects may be routed to each of the associated computer network components in parallel. Such parallel routing may be incorporated in implementations such as an electronic procurement process where the processing by the computer network components may be as simple as an approval/rejection of a particular approval object. In such cases, the data pertaining to the approval objects may be simultaneously sent to the various computer network processing components to solicit an approval or rejection response.

As can be appreciated, with complex computing systems and related processes, the association of the approval objects with a specific computer network component may became outdated or otherwise obsolete. Accordingly, to ensure that the associations remain current, the association step 620 may also include the steps of determining (i.e., at predefined regular intervals or alternatively at irregular intervals and/or on command) if processing requirements for a computer network component have been modified, and reassociating each approval object affected by the modified processing requirements with one or more computer network components. If at least a portion of the processing has already occurred, then the method may simply subject the approval objects to processing by the all of the associated computer network components, or alternatively, only to those computer network components affected by the reassociation. Furthermore, in some variations, the approval objects may be modified during processing and as a result, the underlying items may need to be re-associated with different approval objects for subsequent routing and status manipulation processing.

After the electronic document has been fully processed, an indicator signal may be provided to an external source which includes a notification, such as a flag, that processing has completed and was successful (alternatively, a different flag may be used if the processing was not completed or otherwise successful). Whether or not an indicator signal is incorporated into the method, each processed approval object may be correlated with one or more vendor nodes. After the approval objects are correlated, they are assembled (or grouped) into commonly correlated vendor nodes so that a follow-on electronic document (e.g., purchase order or other data set) may be generated. Once generated, the follow-on electronic document is then sent to the applicable vendor node (or multiple vendor nodes if a competitive bid is solicited).

Figure 7:
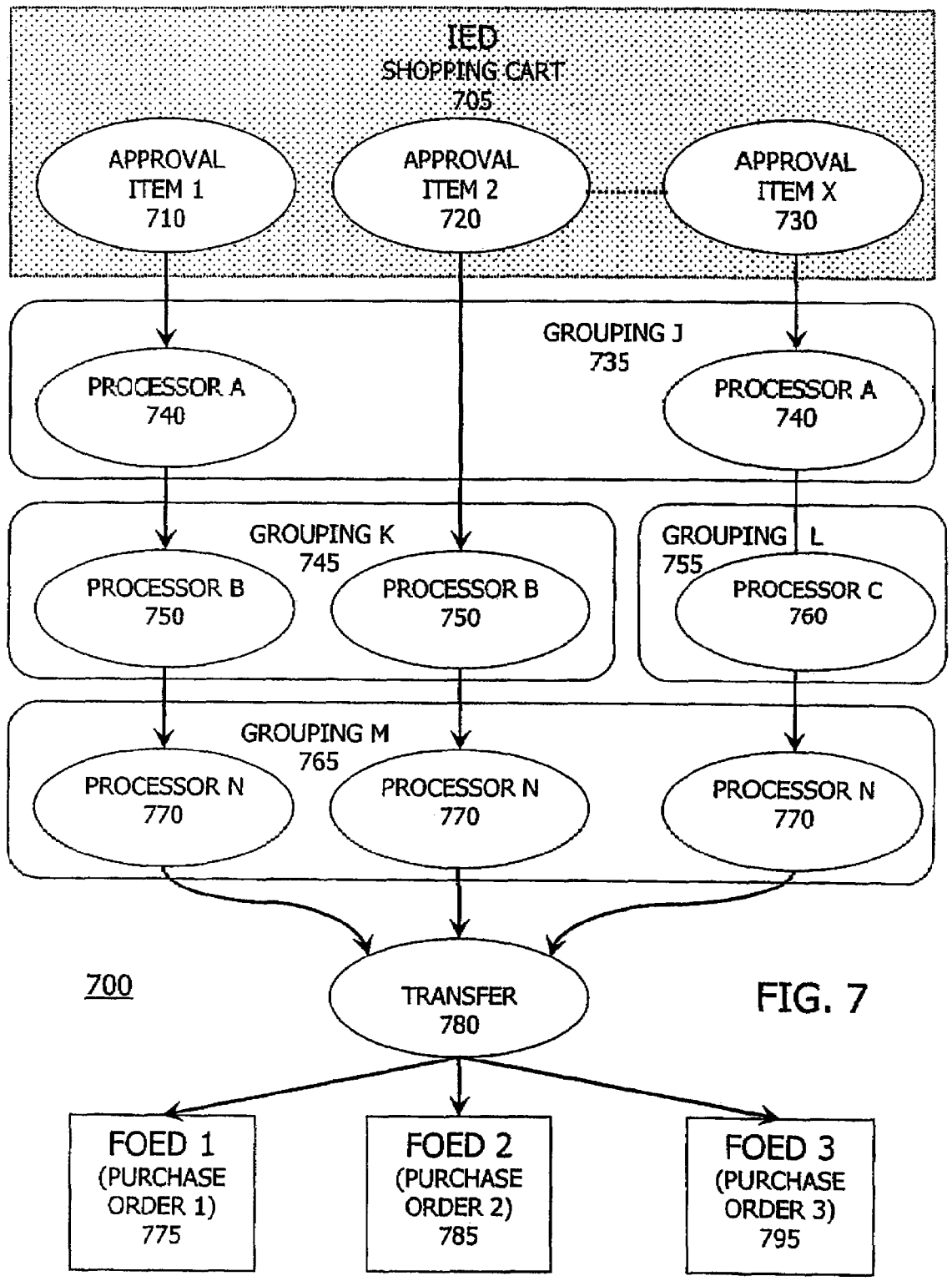
FIG. 7 is an example useful for understanding and implementing embodiments consistent with the invention as applied to an electronic procurement process.

FIG. 7 illustrates an example in the form of a flowchart diagram 700 useful for understanding and implementing embodiments of the invention in the context of the exemplary electronic procurement process discussed above.

After the contents of an initial electronic document IED (such as a shopping cart) 705 have been finalized (through the generation of a data command), approval items 710, 720, 730, if any, are identified therein (and it will be appreciated that more than three approval objects may be used in connection with the invention). The approval items 710, 720, 730 are then associated with one or more distributed processors 740, 750, 760, 770 so that they may be grouped together to form individual approval objects based on their status manipulation processing requirements (that may be predefined).

For example, GROUPING J 735 is an approval object including approval item A 710 and approval item X 730, GROUPING K 745 is an approval object including approval item A 710 and approval item B 730, GROUPING L 755 is an approval object including approval item 730, whereas GROUPING M 765 includes all three approval items 710, 720, 730. As is shown, with this example, the approval items 710, 720, 730 are only provided to those processors 740, 750, 760, 770 that have been associated therewith (e.g. based on properties of the bundled items), rather than each of the approval items being provided to each processor (thus reducing network traffic as well as reducing the consumption of processing power). It will also be noted that several approval objects may be processed simultaneously in variations where an approval item 730 is not grouped together with other approval items 710, 720 for a particular approval object 755.

In the procurement context, the processors 740, 750, 760, 770 and the resulting groupings 735, 745, 755, 765 may pertain to factors such as overall cost associated with the approval items 710, 720, 730 (e.g., approval objects, or individual approval items continual therein, having costs within €1,000 to €2,000 are processed by processor B 750), the type of products or services associated with the approval objects (e.g., all approval objects relating to information technology, such as computers and related hardware, are sent to processor A 740), and/or the associated identifiers of vendors that would provide the services and/or products. Each of the approval objects 735, 745, 755, 765 is sent to those computer network components associated either directly with the contents of the related approval items 710, 720, 730, or associated with products or services relating to the approval objects.

Once the approval items 710, 720, and 730 have been affirmatively processed as GROUPING L 765 by processor N 770, the contents of the initial electronic document (e.g., shopping cart) are then provided to a transfer unit 780. The transfer unit 780 determines which of a plurality of vendor network nodes (corresponding to computer network components associated with a vendor that are accessible via a computer network such as the Internet) are associated with each approval item 710, 720, and 730 as well as other contents within the initial electronic document that did not require a status manipulation operation. After this determination is made, the transfer unit may generate one or more follow-on electronic documents FOEDs (e.g., purchase orders) 775, 785, 795 that may be subsequently transmitted to the vendor nodes. For single source procurement, each approval item 710, 720, 730 will only be included in a single follow-on electronic document 775, 785, 795. If a competitive bid is sought, then an approval item 710, 720, 730 may be included in multiple follow-on electronic documents 775, 785, 795.

Embodiments of the invention may provide a flexible technique in which an approval object may be associated with one or more computer network components. The skilled artisan will recognize, however, that in some circumstances the grouping step to form the approval objects may be based on the processing requirements of one or more of the computer network components and, as such, a separate association step is not required for routing purposes. Such an arrangement might be particularly useful when the criteria used for grouping together the approval items to form approval objects is based on the processing requirements of the computer network components. For example, if an approval item is associated with a purchase exceeding €1,000, then it be grouped and later routed to a specified computer network component. On the other hand, with the main techniques described above, the computer network components associated with certain criteria may be dynamically changed and, as such, there may be a need for a separate grouping and association step (as there may be no fixed association between types of approval objects and the computer network components). With this latter arrangement, for example, an approval item may is associated with a purchase exceeding €1,000, and it is between 8 am and 12 pm, then the grouping of the approval object may be routed to a first computer network component. After 12 pm, this same approval object may be routed to a second computer network component that will process the approval object.

It will be appreciated from the above that the embodiments of the invention may provide an efficient technique for handling an electronic document containing multiple items that may be subjected to processing by one or more external computer network components. With this arrangement, network traffic may be reduced and processing power consumption minimized as only data pertaining to approval objects associated with a particular computer network component is transmitted.

Although embodiments of the present invention have been illustrated in the accompanying drawings and described in the foregoing description, it will be understood that the invention is not limited to the embodiments disclosed herein. Embodiments of the invention are capable of numerous rearrangements, modifications and substitutions without departing from the scope of the invention as set forth and defined by the following claims. It is intended, therefore, that the specification and examples be considered as exemplary only, with a true scope and spirit of the invention being indicated by the following claims.

What is claimed is:

1. A computer-implemented method for processing an electronic document by one or more computer network components having network addresses in a computer network, the method comprising the steps performed by a computer of:
   identifying, by a processor included in the computer, a plurality of approval items requiring status manipulation operations within the electronic document;
   grouping together the approval items to form a plurality of approval objects based on the properties of the approval items, wherein at least one of the approval items is included in a first one of the plurality of approval objects and a second one of the plurality of approval objects;
   associating each approval object with at least one of a plurality of computer network components based on the properties of the approval object;
   routing each approval object to the network addresses of the associated computer network components for status manipulation processing, wherein the status manipulation processing of each approval object comprises processing the approval items included in each approval object;
   determining whether one of the processed approval items has been modified by at least one of the associated computer network components;
   re-grouping the modified approval item into a different one of the approval objects for routing to at least one of the associated computer network components for further status manipulation processing, when the determination is positive;

correlating one of the processed approval items with a vendor node and including the processed approval item in a follow-on electronic document corresponding to the vendor node when single source procurement is appropriate;

correlating each one of the processed approval items with multiple vendor nodes and including each one of the processed approval items in multiple follow-on electronic documents individually corresponding to the vendor nodes when competitive procurement is appropriate, wherein multiple processed approval items are included in one of the follow-on electronic documents; and transmitting the follow-on electronic documents to the vendor nodes.

2. The method of claim 1, wherein the approval objects are sequentially routed to each of the associated computer network components.

3. The method of claim 2, further comprising ranking the order in which the approval objects are routed to each of the associated computer network components.

4. The method of claim 1, wherein the approval objects are routed to each of the associated computer network components in parallel.

5. The method of claim 1, wherein associating comprises:
determining if processing requirements for a computer network component have been modified; and
reassociating each approval object affected by the modified processing requirements with at least one of the computer network components.

6. The method of claim 1, further comprising providing an indicator signal after the electronic document has been processed by the associated computer network components.

7. The method of claim 1, wherein routing comprises using header information and item information within the electronic document to route the groups of approval objects.

8. A computer readable recording medium storing a program for causing a computer to perform a method for processing an electronic document, the method comprising:
identifying a plurality of approval items requiring status manipulation operations within the electronic document;
grouping together the approval items to form a plurality of approval objects based on the properties of the approval items, wherein at least one of the approval items is included in a first one of the plurality of approval objects and a second one of the plurality of approval objects;
associating each approval object with at least one of a plurality of computer network components based on the properties of the approval object;
routing each approval object to the network addresses of the associated computer network components for status manipulation processing, wherein the status manipulation processing of each approval object comprises processing the approval items included in each approval object;
determining whether one of the approval items has been modified by at least one of the associated computer network components;
re-grouping the modified approval item into a different one of the approval objects for routing to at least one of the associated computer network components for further status manipulation processing, when the determination is positive;
generating a follow-on electronic document after the status manipulation processing of the approval objects, wherein at least one of the processed approval items is included in the follow-on electronic document;
correlating one of the processed approval items with a vendor node and including the processed approval item in a follow-on electronic document corresponding to the vendor node when single source procurement is appropriate;
correlating each one of the processed approval items with multiple vendor nodes and including each one of the processed approval items in multiple follow-on electronic documents individually corresponding to the vendor nodes when competitive procurement is appropriate, wherein multiple processed approval items are included in one of the follow-on electronic documents; and
transmitting the follow-on electronic documents to the vendor nodes.

9. The computer readable recording medium of claim 8, wherein the approval objects are sequentially routed to each of the associated computer network components.

10. The computer readable recording medium of claim 9, wherein the method further comprises ranking the order in which the approval objects are routed to each of the associated computer network components.

11. The computer readable recording medium of claim 8, wherein the approval objects are routed to each of the associated computer network components in parallel.

12. The computer readable recording medium of claim 8, wherein associating comprises:
determining if processing requirements for a computer network component have been modified; and
reassociating each approval object affected by the modified processing requirements with at least one of the computer network components.

13. The computer readable recording medium of claim 8, wherein the method further comprises providing an indicator signal after the electronic document has been processed by the associated computer network components.

14. The computer readable recording medium of claim 8, wherein routing comprises using header information and item information within the electronic document to route the groups of approval objects.

15. A system for processing a plurality of approval items by one or more computer network components having network addresses in a computer network, the system comprising:
an application server comprising a processor and a memory, the application server for identifying the plurality of approval items requiring status manipulation operations within an electronic document;
a grouping unit to group together the approval items to form a plurality of approval objects based on the properties of the approval items, wherein at least one of the approval items is in a first one of the plurality of approval objects and a second one of the plurality of approval objects;
an association unit to associate each approval object with at least one of a plurality of computer network components based on the properties of the approval object;
a routing unit to route each approval object to the network addresses of the associated computer network components for status manipulation processing, wherein the status manipulation processing of each approval object comprises processing the approval items included in each approval object; and a generating unit to generate a follow-on electronic document after the status manipulation processing of the approval objects, the generating unit:

correlating one of the processed approval items with a vendor node and including the processed approval item in a follow-on electronic document corresponding to the vendor node when single source procurement is appropriate, and correlating each one of the processed approval items with multiple vendor nodes and including each one of the processed approval items in multiple follow-on electronic documents individually corresponding to the vendor nodes when competitive procurement is appropriate, wherein multiple processed approval items are included in one of the follow-on electronic documents.

16. The method of claim 1, wherein the electronic document corresponds to a shopping cart, and the follow-on electronic document corresponds to a purchase order.

17. The method of claim 1, wherein the approval items are products or services selected for purchasing.

18. The method of claim 17, wherein the status manipulation operations comprise approving the purchasing of an approval item.

19. The method of claim 1, wherein the properties comprise at least one of price, type of product or service, and identifiers of vendors.

20. The method of claim 1, wherein the status manipulation operations comprise making a determination related to an approval item.

21. The method of claim 1, wherein the at least one of the approval items is further included in a third one of the plurality of approval objects.

\* \* \* \* \*

UNITED STATES PATENT AND TRADEMARK OFFICE
CERTIFICATE OF CORRECTION

PATENT NO. : 7,596,543 B2  Page 1 of 1
APPLICATION NO. : 11/187029
DATED : September 29, 2009
INVENTOR(S) : Lange et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Twenty-eighth Day of September, 2010

David J. Kappos
*Director of the United States Patent and Trademark Office*